(12) United States Patent
Wurm et al.

(10) Patent No.: US 8,016,049 B2
(45) Date of Patent: Sep. 13, 2011

(54) METHOD AND APPARATUS FOR INSTALLING A BOREHOLE HEAT EXCHANGER IN THE EARTH

(75) Inventors: Dieter Wurm, Kirchhundem (DE); Hans-Joachim Bayer, Kohlberg (DE)

(73) Assignee: TRACTO-TECHNIK GmbH & Co. KG, Lennestadt (DE)

(*) Notice: Subject to any disclaimer, the term of this patent is extended or adjusted under 35 U.S.C. 154(b) by 0 days.

(21) Appl. No.: 12/038,411

(22) Filed: Feb. 27, 2008

(65) Prior Publication Data

US 2008/0202723 A1 Aug. 28, 2008

(30) Foreign Application Priority Data

Feb. 27, 2007 (DE) .......................... 10 2007 009 773

(51) Int. Cl.
*E21B 7/26* (2006.01)
*E21B 36/00* (2006.01)
*F24J 3/08* (2006.01)

(52) U.S. Cl. ......... 175/19; 166/302; 60/641.2; 405/184; 405/130; 165/45

(58) Field of Classification Search .................. 175/19; 166/302; 60/641.2; 62/260; 405/184, 184.3, 405/130; 165/45
See application file for complete search history.

(56) References Cited

U.S. PATENT DOCUMENTS

| 4,052,857 | A | * | 10/1977 | Altschuler | 60/641.2 |
| 4,067,200 | A | * | 1/1978 | Watts et al. | 405/184 |
| 4,286,651 | A | * | 9/1981 | Steiger et al. | 165/45 |
| 4,925,344 | A | * | 5/1990 | Peres et al. | 405/184 |
| 5,161,626 | A | * | 11/1992 | Laffkas | 175/22 |
| 5,634,515 | A | | 6/1997 | Lambert | |
| 2005/0061472 | A1 | | 3/2005 | Guynn et al. | |

FOREIGN PATENT DOCUMENTS

| DE | 31 14 262 A1 | 11/1982 |
| DE | 102 02 261 A1 | 8/2003 |
| NL | 1006037 | 11/1998 |
| WO | WO 9321393 A1 * | 10/1993 |

* cited by examiner

*Primary Examiner* — Shane Bomar
*Assistant Examiner* — Catherine Loikith
(74) *Attorney, Agent, or Firm* — Henry M. Feiereisen; Ursula B. Day

(57) ABSTRACT

In a method of installing a borehole heat exchanger in the earth, a channel is formed in the earth by means of a pushing device, thereby causing a compression of the earth as a result of earth being displaced, and inserting a borehole heat exchanger in the channel, causing an elastic component of the earth to move toward the heat exchanger as the earth relaxes in order to provide an intimate contact between the earth and the heat exchanger. Installation of the borehole heat exchanger in elastically displaced earth ensures not only a stable and lasting securement of the heat exchanger in the earth but also the intimate contact between earth and heat exchanger wall so important for heat exchanger.

6 Claims, 3 Drawing Sheets

METHOD AND APPARATUS FOR INSTALLING A BOREHOLE HEAT EXCHANGER IN THE EARTH

CROSS-REFERENCES TO RELATED APPLICATIONS

This application claims the priority of German Patent Application, Serial No. 10 2007 009 773.7-24, filed Feb. 27, 2007, pursuant to 35 U.S.C. 119(a)-(d), the content of which is incorporated herein by reference in its entirety as if fully set forth herein.

BACKGROUND OF THE INVENTION

The present invention relates, in general, to a method and apparatus for installing borehole heat exchangers in the earth.

Nothing in the following discussion of the state of the art is to be construed as an admission of prior art.

In the geothermic field, in particular when exploiting the geothermal energy for heating homes is involved, borehole heat exchangers are introduced into the earth through excavation of the ground or through drilling channels. Insofar as the heat exchangers are not installed open, it is common to drill vertical channels, for example with an augering device and to then install the borehole heat exchangers into the borehole.

U.S. Pat. No. 5,634,515 describes a method and a respective apparatus for installing heat exchangers into a borehole. This apparatus is intended to enable a simplified installation of geothermal systems in the earth, useful in particular for already existing building structures. The heat exchangers are hereby installed trenchless, however not vertical but horizontal. A drilling device bores several channels into the earth. In a second step, the respective heat exchangers are pushed into these boreholes.

A problem common to known trenchless methods is the absence of an optimum contact between earth and heat exchanger so that heat conduction is impaired and the heat exchangers are sometimes not secured enough.

It would therefore be desirable and advantageous to address this problem and to obviate other prior art shortcomings

SUMMARY OF THE INVENTION

According to one aspect of the present invention, a method of installing a borehole heat exchanger in the earth includes the steps of forming a channel in the earth by means of a pushing device, thereby causing a compression of the earth as a result of earth being displaced, and inserting a borehole heat exchanger in the channel, causing an elastic component of the earth to move toward the heat exchanger in order to provide an intimate contact between the earth and the heat exchanger.

The present invention resolves prior art problems by utilizing the elastic component (in particular the cohesive portion) of displaced earth for borehole heat exchangers. This is possible by installing the borehole heat exchangers into the earth such that the earth is compacted through displacement in at least one operative step and moves towards the heat exchanger during the relief process. The installation of the heat exchanger in elastically displaced earth ensures not only a stable and lasting securement of the heat exchanger in the earth but also the intimate contact between earth and heat exchanger wall so important for borehole heat exchangers.

Suitably, thermal insulating material can be used to assist the abutment against the heat exchanger.

According to another feature of the present invention, a particular degree of displacement can be selected in dependence on certain parameters before displacement of the earth in order to effect the desired compression of the earth. Depending on the type of earth, its displacing capability, its heat conductivity, and the available push-in device can be adjusted for optimum displacement.

Securement of the heat exchanger while attaining a respective intimate contact to the surrounding material can be further enhanced in earth which has a high elastic component during deformation. When the earth relaxes after displacement, the earth conforms to the shape of the heat exchanger and permits an improved heat transfer and firm fit. Thus, the presence of insulating air layers can be minimized.

A pilot bore may hereby be first provided having a diameter which is smaller than the diameter of the borehole heat exchangers to be installed, and then the borehole heat exchanger is pressed in a second step into the earth with the assistance of a pushing head.

The pilot bore as such may already involve the displacement operation or this operation may take place during installation of the heat exchanger. Thus, the installation of the heat exchanger may involve a first and a further displacement step. As an alternative, the heat exchanger may be installed also without additional displacement, when the displacement is realized already during implementation of the pilot bore. Preferably, a pushing head is used which is made of two parts and has a tip which may provide protection of the guide in the earth. In addition, a star-shaped pushing member may be used for receiving and tailored disposition of the heat exchangers and for providing their support.

According to another feature of the present invention, an induction pipe gating may be provided to enable a backfilling of the borehole with thermal insulating material. The induction pipe may be arranged in midsection to thereby permit a targeted and precise form-fitting backfilling of the heat exchangers. The induction pipe gating may include an integrated release system to enable insulating material to issue out when the pushing rods are withdrawn. This withdrawal is possible in particular because of the geometric shape of a preferred pushing head with collar configuration, without destabilizing the fit of the heat exchanger. The heat exchangers can be stabilized in addition by the respective configuration of the star-shaped pushing member.

Depending on the consistence of the earth, the heat exchanger may also be installed into the ground to directly effect a displacement without pilot bore by using a respectively displacing pushing head which is pushed into the ground via a rod linkage and drags the heat exchanger with it as it forms the channel.

According to another feature of the present invention, the pushing head may have a geometric shape to apply a holding force in the earth in order to additionally ensure a secure fit of the heat exchangers in the earth. The heat exchanger may be driven in by a pushing head which has a conical to frustoconical configuration and includes a collar. The pushing head remains in the ground after being driven in. The collar provides an additional securement of the heat exchanger and prevents it from slipping back in the channel.

The heat exchanger and/or pilot bore is suitably provided in the ground with a statically operating linear pushing device, for example a hydraulic drive or electric drive and pushing carriage. The possible thrust force can hereby be suited to the degree of displacement. In addition, the pushing device may also execute a rotation or, optionally, apply hammer blows to assist the push-in operation.

According to another feature of the present invention, a pilot bore can be established by using a device which includes device a leading cutting head that digs into the earth to form a pilot bore, and an expansion tool which is operatively connected to the cutting head for upsizing the pilot bore to form the channel, with the expansion tool being provided with leading drill bits, compaction rollers extending inwardly of the drill bits, and stabilization grooves which together with the compaction rollers provide an even distribution of earth compression and thereby ensure the earth to evenly wrap around the heat exchanger. This device allows the realization of a channel with little force application, even when conditions are difficult. More or less earth may be displaced in dependence on the selection of the diameter of the expansion tool to thereby select an optimum adjustment of the displacement. The grooves allow easier propulsion and together with the rollers an especially even distribution of the earth compression across the perimeter to thereby ensure the earth to evenly wrap around the heat exchangers. The rollers may hereby be configured for rotation.

The present invention is applicable with a linear pushing device which forces a plurality of channels for the borehole heat exchangers from a central position into the earth and can be adjusted hereby to certain angles. The angle adjustment is preferred in two degrees of freedom so as to allow a spherical head like alignment of the heat exchangers.

This allows the rapid use of small drilling equipments without the need for constant change in location, while at the same time being gentle to nature. In addition, the provision of boreholes in developed locales is possible even when the space conditions are tight. The channels are preferably aligned in such a way that water-carrying layers are reached to attain a higher heat absorption capacity. When the borehole is star-shaped, the probability is already increased per se to reach such a layer. U-shaped loops are preferred as use for heat exchangers so that the heat medium is able to circulate.

The pushing head can be connected by a bayonet coupling or plug connection with the rod linkage and is also releasable via the bayonet coupling. This may be realized by a certain turning motion for example. The pushing head may be firmly connected with the rod linkage in one rotation direction. The pushing head is then bored in this rotation direction into the ground with the heat exchanger with the aid of the rod linkage. When reversing the rotation direction of the rod linkage—this should take place only at the end of the drilling operation—the rod linkage detaches from the pushing head and may be extracted from the bored channel.

According to another feature of the present invention, a remaining cavity—if present—between heat exchanger and borehole wall can be insulated. This may be implemented as the rod linkage is withdrawn. In accordance with the invention, the elastic component of the earth acts then via the insulating material.

As an alternative, the insulating material may also be responsible as such for the elastic component. In particular, when the grounds are not cohesive, doughy insulating material may be kneaded into the channel. In this way, the non-cohesive and the absent elastic component, or an added cohesive or elastic component can be fed to the ground.

According to another feature of the present invention, the pushing head may include a freewheel to enable a rotation of the rod linkage without joint rotation of the heat exchanger. The freewheel is suitable split to allow a simple installation.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
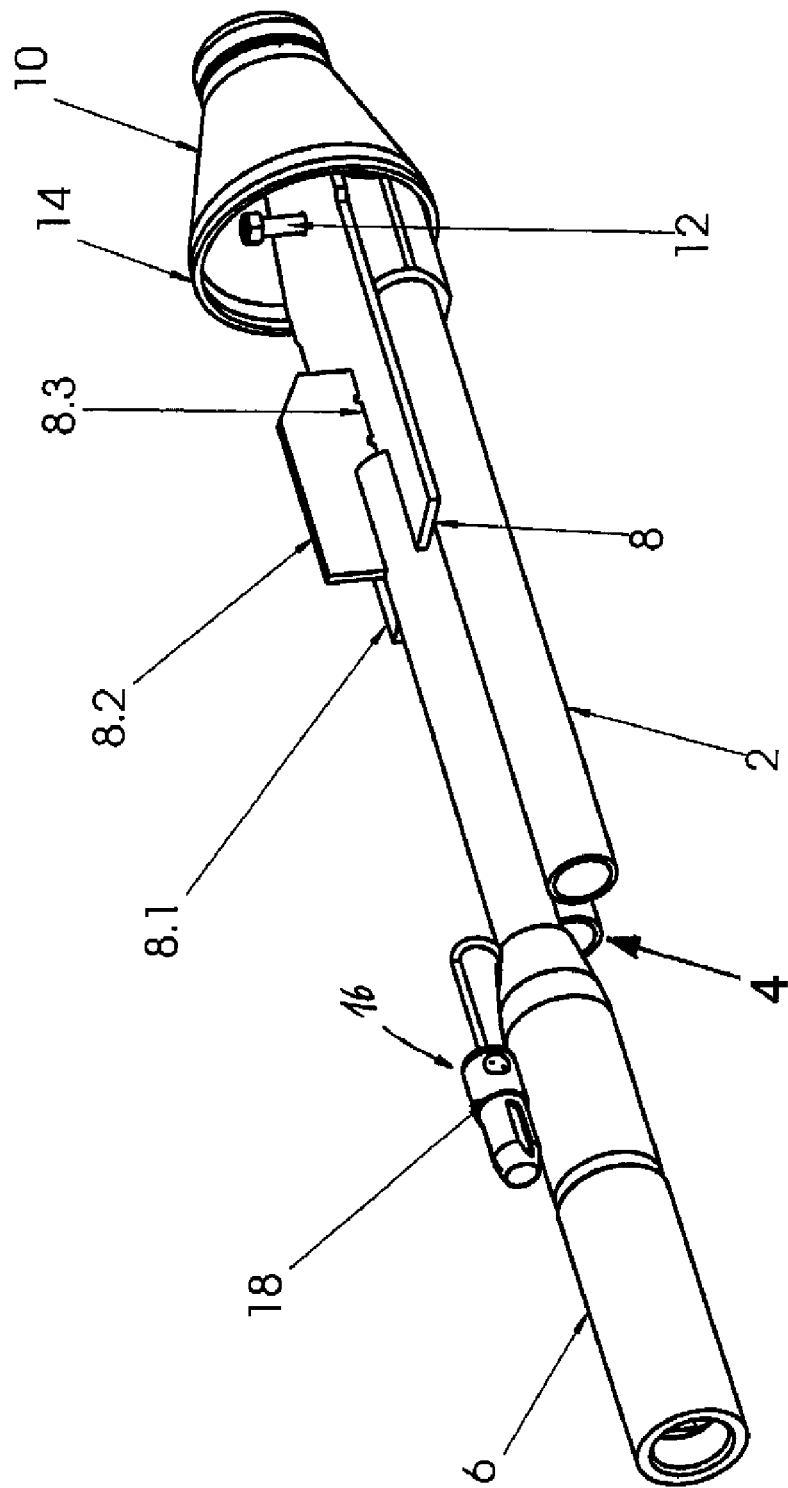
FIG. 1 is a schematic perspective illustration of a pushing device according to the present invention.
Figure 2:
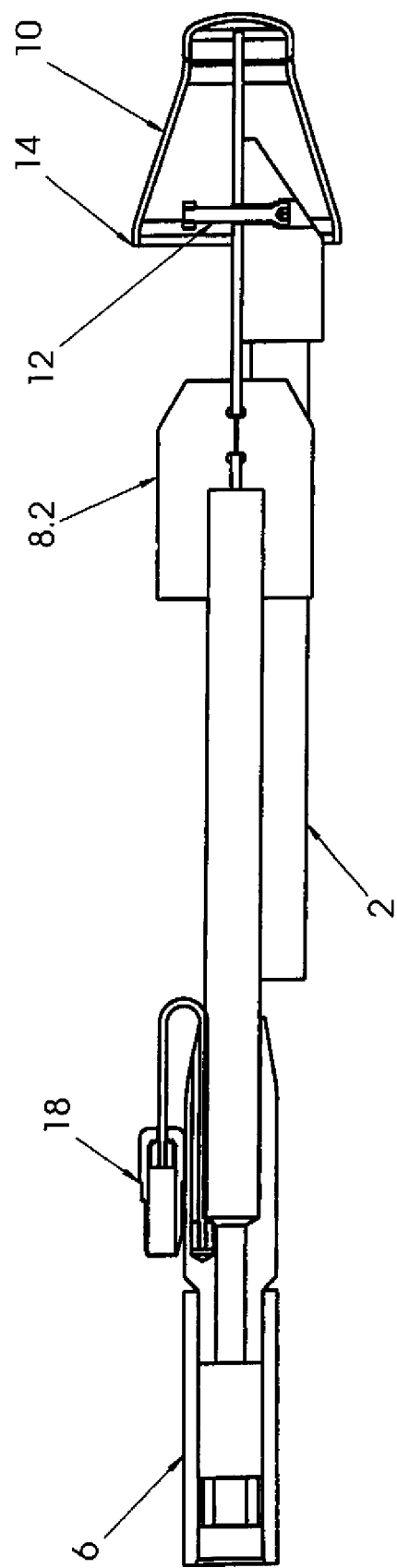
FIG. 2 is a sectional view of the pushing device of FIG. 1.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a schematic perspective illustration of a pushing device used for displacing earth and insertion of heat exchangers 2, 4. The pushing device includes a thrust tube 6 which transmits a thrust force originating from a thrust drive (not shown) via a star-shaped pushing member 8 onto a frustoconical pushing head 10. The star-shaped pushing member 8 has additional stabilizing fins 8.1, 8.2, 8.3 to define compartments in which the borehole heat exchangers 2, 4 are arranged and which ensure a better fit in the earth. The pushing head 10 includes a retention bolt 12 for the heat exchanger heads and a collar 14 for securement in the earth. The collar 14 prevents the borehole heat exchangers 2, 4, mounted in the pushing head 10, from slipping back, in particular when the thrust tube 6 is withdrawn.

Disposed at the end of the thrust tube 6 is an induction pipe 16 with a release unit 18 which enables a backfilling with insulating material as the thrust tube 6 is withdrawn.

When inserting the borehole heat exchangers 2, 4 into the ground, the pushing head 10 pushes aside the earth. The elastic component of the deformed earth has the effect that the earth reverts back to a certain extent to its original position after the pushing head has been pushed in to thereby secure the borehole heat exchangers 2, 4 and the pushing head 10. Fins 8 stabilize hereby the direction and prevent rotation which would cause twisting of the borehole heat exchangers. Thereafter, the thrust tube 6 is withdrawn while at the same time the remaining void is backfilled with insulating material.

Figure 3:
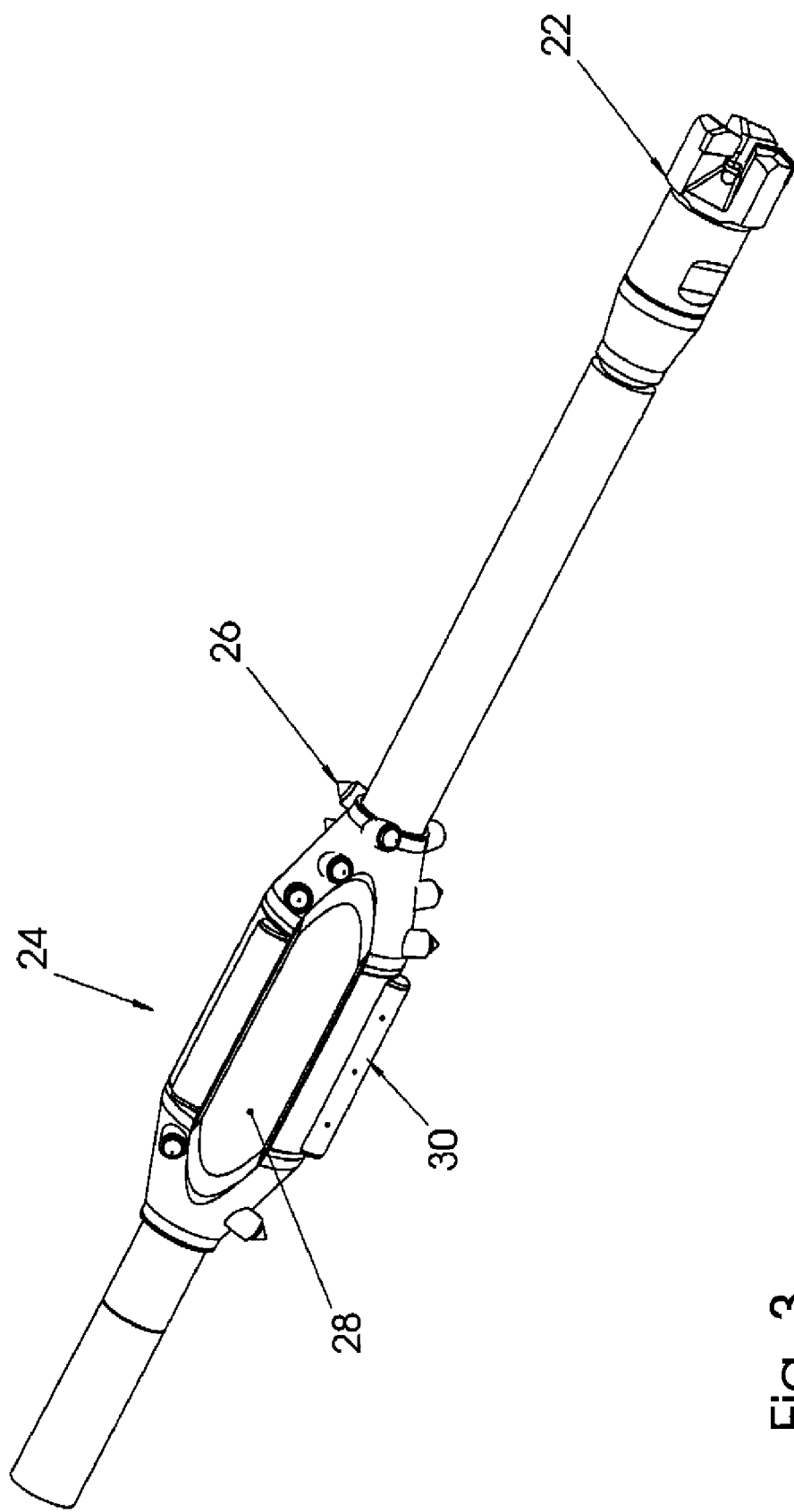
FIG. 3 is a schematic perspective illustration of a device for providing a pilot bore in accordance with the invention.

FIG. 3 shows a schematic perspective view of a device for providing a pilot bore. The device includes a leading cutting head 22 and an expansion tool 24. The expansion tool 24 has bits 26 and grooves 28 as well as compaction rollers 30. With this arrangement it is possible to provide a channel with little force application, even when the ground is problematic, and to displace more or less earth depending on the selection of the diameter of the expansion tool 24. After establishing the pilot bore with the device, the borehole heat exchanger 2, 4 is then pressed into the earth with the assistance of the pushing head 10. The grooves 28 permit together with the rollers 30 an even distribution of the earth compression and thus ensure the earth to evenly wrap around the borehole heat exchangers.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed is:

1. A method of installing a borehole heat exchanger in the earth, comprising the steps of:
   forming a channel in the earth by pushing a pushing head through the earth by means of a thrust tube which is operatively connected to the pushing head, thereby causing a compression of the earth as a result of earth being displaced; and
   inserting a borehole heat exchanger in the channel as the pushing head is moved through the earth, causing an elastic component of the earth to move toward the heat exchanger in order to provide an intimate contact between the earth and the heat exchanger;
   releasing the thrust tube from the pushing head; and
   withdrawing the thrust tube from the channel.

2. The method of claim 1, wherein the forming step includes the steps of determining a desired degree of earth displacement on the basis of at least one parameter selected from the group consisting of earth condition, maximum thrust force of the pushing device, and elasticity of the earth, and selecting a displacement tool in accordance with the desired degree of displacement.

3. The method of claim 1, wherein the forming step includes the successive steps of creating a pilot bore of a diameter which is smaller than a diameter of the borehole heat exchanger, and forcing the pushing head into the pilot bore to form the channel.

4. The method of claim 1, wherein the pushing head has a geometric shape to apply a holding force sufficient to secure the borehole heat exchanger in place.

5. The method of claim 4, further comprising the step of backfilling cavities in the channel with insulating material, when withdrawing the thrust tube.

6. The method of claim 1, further comprising the step of introducing insulating material into the channel for influencing the elastic component of the earth.

* * * * *